No. 776,693. PATENTED DEC. 6, 1904.
H. M. SCHLIESSER.
DIVIDER ATTACHMENT FOR MOWERS.
APPLICATION FILED OCT. 11, 1902.
NO MODEL.

WITNESSES: Herman M. Schliesser INVENTOR

BY
ATTORNEY

No. 776,693. Patented December 6, 1904.

UNITED STATES PATENT OFFICE.

HERMAN M. SCHLIESSER, OF MARK CENTER, OHIO.

DIVIDER ATTACHMENT FOR MOWERS.

SPECIFICATION forming part of Letters Patent No. 776,693, dated December 6, 1904.

Application filed October 11, 1902. Serial No. 126,866. (No model.)

*To all whom it may concern:*

Be it known that I, HERMAN M. SCHLIESSER, a citizen of the United States, residing at Mark Center, Defiance county, Ohio, have invented certain new and useful Improvements in Divider Attachments for Mowers; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in divider attachments for mowers; and the object thereof is to afford means to prevent the divider-point of the mower from becoming caught in tangled growths.

I accomplish my object by the construction illustrated in the accompanying drawings, in which—

Figure 1:
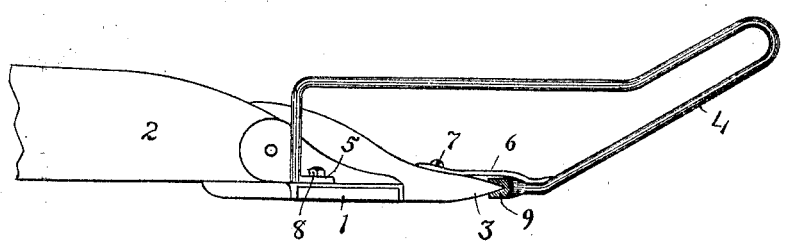
Figure 2:
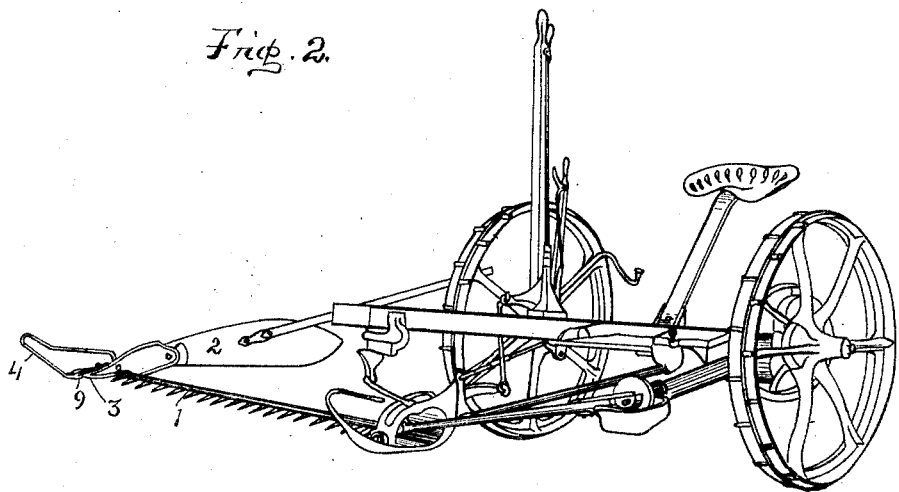

Figure 1 is a side elevation showing the outer end of the guide-bar of a mowing-machine with my attachment in place on the divider, a part of the attachment in section; and Fig. 2 is a perspective view of a mowing-machine, showing my attachment in position.

Similar numerals of reference indicate corresponding parts in both views, and referring now to the same, 1 is the guide-bar of the mowing-machine, to which the grain-board 2 and divider 3 are rigidly fixed.

My attachment consists of the runner 4, formed of a metal rod. The said rod has an enlarged head 9, which is recessed to fit over the point of the divider 3. A wing 6 is welded to said rod at a point contiguous to the head 9 and is attached to the divider 3 by means of a screw 7. The said rod leads forward from its head 9 at a suitable upward incline and then extends rearwardly and is turned downward with its end 5 resting upon the guide-bar 1. A bolt 8 serves to hold the end 5 of the rod in fixed position upon said guide-bar.

In using my invention the runner rides over the tangled growths and prevents the same from looping over the divider and interfering with the forward travel of the machine.

Having described my invention, what I claim as new, and desire to secure by Letters Patent, is—

1. In combination with a mowing-machine, of a divider, and a runner, comprising a recessed head engaging the forward end of said divider, a wing connected to the head and divider for holding the parts assembled, a rod extending from said head and leading forwardly and upwardly therefrom, and then extending rearwardly and having a downturned end 5 suited to be attached to the guide-bar of the mowing-machine, and thereby support the forward part of said rod.

2. In combination with a mowing-machine, a divider and a runner, comprising a recessed head which fits the forward end of said divider, a curved wing having one end welded to one side of said head, and the other end removably secured to said divider, a rod extending from said head forwardly and upwardly therefrom and then extending rearwardly and having a downward-turned end 5 adapted to be attached to the guide-bar of the mowing-machine, and thereby support the forward part of said rod.

In testimony whereof I affix my signature in presence of two witnesses.

HERMAN M. SCHLIESSER.

Witnesses:
 WALTER G. BURNS,
 EMMA H. POPE.